United States Patent [19]

Jannemann et al.

[11] Patent Number: 4,557,220
[45] Date of Patent: Dec. 10, 1985

[54] GAS APPARATUS FOR PRODUCING HOT WATER

[75] Inventors: Theo Jannemann, Dorsten; Horst Brünje, Rellinghausen, both of Fed. Rep. of Germany

[73] Assignee: Ruhrgas Aktiengesellschaft, Essen, Fed. Rep. of Germany

[21] Appl. No.: 571,553

[22] PCT Filed: Apr. 27, 1983

[86] PCT No.: PCT/DE83/00076
§ 371 Date: Dec. 27, 1983
§ 102(e) Date: Dec. 27, 1983

[87] PCT Pub. No.: WO83/03890
PCT Pub. Date: Nov. 10, 1983

[30] Foreign Application Priority Data

Apr. 28, 1982 [DE] Fed. Rep. of Germany ....... 3215779

[51] Int. Cl.[4] ............................................. F22B 33/00
[52] U.S. Cl. .................................... 122/20 B; 122/14; 122/19; 122/155 R; 122/161; 122/177; 237/19
[58] Field of Search ............... 122/14, 18, 19, 20 B, 122/153, 155 R, 155 F, 160, 161, 166 R, 176, 177; 431/215; 237/19

[56] References Cited

U.S. PATENT DOCUMENTS

| | | | |
|---|---|---|---|
| 1,107,534 | 8/1914 | Lovekin | 122/20 B |
| 2,041,683 | 5/1936 | Ames | 122/14 |
| 2,348,901 | 5/1944 | Handley | 122/14 |
| 4,163,430 | 8/1979 | Neumann | 122/20 B |
| 4,338,888 | 7/1982 | Gerstmann et al. | 122/18 |
| 4,429,830 | 2/1984 | Forster et al. | 237/19 |
| 4,444,156 | 4/1984 | Iwasaki et al. | 122/20 B |

FOREIGN PATENT DOCUMENTS

| | | | |
|---|---|---|---|
| 2336298 | 2/1975 | Fed. Rep. of Germany | 122/14 |
| 48137 | 4/1977 | Japan | 122/20 B |

Primary Examiner—Albert J. Makay
Assistant Examiner—Steven E. Warner
Attorney, Agent, or Firm—Beall Law Offices

[57] ABSTRACT

There is described here a gas water heater consisting of a blower (1), a premixing device (2), a gas burner (3), a heat exchanger (4), and a waste gas heat exchanger (5). Gas burner (3) works as super-stoichiometrically premixing burner and has a burner plate (9) which is cooled on the reverse side and which has a plurality of mixture passage openings (10). Heat exchanger (4) extends through two chambers (6, 7) which are located next to each other and through which waste gas flows in opposite directions. Condensation heat exchanger (5) works in the counter-current and consists of star-shaped section pieces through which heating water flows centrally and which are arranged vertically. Waste gas heat exchanger (5) and premixing device (2) run parallel to each other.

25 Claims, 3 Drawing Figures

GAS APPARATUS FOR PRODUCING HOT WATER

BACKGROUND OF THE INVENTION

This invention relates to a gas water heater with a gas burner and at least one heat exchanger which is arranged in the gas burner's waste gas duct and through which heating water flows.

In such instruments one customarily uses a laminated heat exchanger which is arranged laterally with respect to the waste gas current, whereby the sheets or laminae lie parallel to the direction of flow of the waste gas current.

It has been found that heat exchange in such gas water heaters is in need of improvement.

SUMMARY OF THE INVENTION

The purpose of the invention therefore is to improve heat exchange in a mechanism of the kind mentioned initially and thus to raise the efficiency.

To solve this problem, the gas water heater according to the invention is characterized by the fact that the waste gas duct forms two chambers which are located next to each other, through which waste gas flows in opposite directions, and whose partition or laminae subdivides the heat exchanger into two segments associated with the chambers and defines a waste gas diversion opening outside the heat exchanger area.

In this way one and the same heat exchanger is being flowed through in two stages according to the cross-current principle and that increases the heat exchange conditions and thus also the efficiency. Here, the design layout is very simple and extremely compact.

The heat exchanger's segment located away from the gas burner preferably forms the heat exchanger's heating water intake. This arrangement thus represents an approach to the counter-current or cross-current principle and works with correspondingly effective heat exchange.

It has been found that particularly good conditions can be achieved by making sure that the chamber, located closest to the gas burner, will contain ⅔ of the heat exchanger's surface.

The chambers are advantageously arranged horizontally and next to each other, above the gas burner. The natural buoyancy of the combustion gases helps make the flow-around conditions of the heat exchanger extremely favorable.

In order further to improve the energy supply into the heat exchanger, the gas water heater according to the invention is furthermore characterized by the fact that the chamber, which is associated with the superstoichiometrically premixing gas burner, is designed as a combustion chamber which is closed off against outside-air entry, and that the gas burner reveals a burner plate which is arranged at an interval of less than 50 mm, preferably less than 30 mm, with respect to the heat exchanger; this plate is provided with between 4 and 12, preferably 9 or 10 mixture passage openings per square centimeter and which has a cooling coil on one side. On the burner plate there is formed a carpet of flames with high heat current density which is located very close to the heat exchanger and which guarantees optimum heat transfer conditions. The energy utilization degree is high and, specifically, also in the partial-load range. An additional advantage is represented by the fact that the waste gases are poor in noxious substances and have a high dew point.

Particularly good conditions result from the fact that the mixture passage openings of the burner plate have a thickness of 1–2.5 mm, preferably 1.8 mm, which is widened by 50% toward the flame side.

The cooling coil of the burner plate is preferably connected to the heating water outlet of the heat exchanger in order thus to be able to utilize the heat withdrawn from the burner plate.

According to another feature of the invention, the gas water heater is characterized by the fact that the burner plate consists of a well heat-conducting material, especially copper or an aluminum alloy. The thickness of the burner plate depends on the layout or placement of the cooling coil. The material's high heat conductivity enables us to make sure that heat can be evacuated favorably from the burner plate and can be transferred to the cooling coil. Alternatively, there is a possibility according to the invention to have the burner plate made of noble steel and to give it preferably a thickness of about 2 mm. Noble steel entails the advantage of higher corrosion and temperature resistance, whereby the lower heat conductivity can be compensated by the fact that the cooling coil is placed more closely or more tightly upon the burner plate.

The gas water heater according to the invention is furthermore characterized by a cross-section or profile constriction arranged immediately in front of the burner plate in the mixture path to prevent burner oscillations.

The waste gases of the gas water heater are cooled into the vicinity of the dew point in the heat exchanger. According to the invention, there is a possibility also to utilize the condensation heat and, specifically in a particularly advantageous manner because, as we said before, the dew point of the waste gas is relatively high. In this connection, the gas water heater is characterized by the fact that there is a condensation heat exchanger which adjoins the segment of the heat exchanger that is removed from the gas burner, through which waste gas flows from top to bottom, and which consists of at least one vertical or approximately vertical pipe through which heating water flows from bottom to top and which has axis-parallel ribs. The condensation heat exchanger works according to the counter-current principle, whereby the condensate can be precipitated on the large-surface ribs and can run off there, downward. The condensate forms a film-like laminar flow or current which, in contrast to a droplet formation, guarantees good heat transfer conditions and does not lead to a cross-section constriction.

Besides, deposits due to corrosion have hardly any cross-section-narrowing effect by virtue of this design. This applies particularly when the pipe—as proposed according to the invention—forms a star-shaped profile or sections. Such section shapes or by the way are commercially available and accordingly are reasonably-priced mass production items.

For reasons of corrosion it is advantageous to have the pipe, with its ribs, consist of aluminum alloy which is corrosion-resistant against waste gas and waste gas condensate.

Preferably, several pipes are arranged next to each other with their axes in a common plane. One thus gets a relatively flat condensation heat exchanger with good flow conditions for the waste gas.

According to another advantageous feature, the mechanism according to the invention is characterized by the fact that there is associated with the gas burner a premixing device which contains a blower and which extends essentially parallel to the condensation heat exchanger whereby preferably the latter's waste gas outlet forms a coaxial pipe with the blower's intake. This results in a very compact design especially when the waste gas outlet and the blower intake are guided coaxially or on the same level parallel to each other, horizontally, through an outside wall or into an air-waste-gas chimney.

BRIEF DESCRIPTION OF THE DRAWING

The invention will be explained in greater detail below with the help of preferred examples in connection with the attached drawing. This drawing shows the following.

DETAILED DESCRIPTION OF A PREFERRED EMBODIMENT

Figure 1:
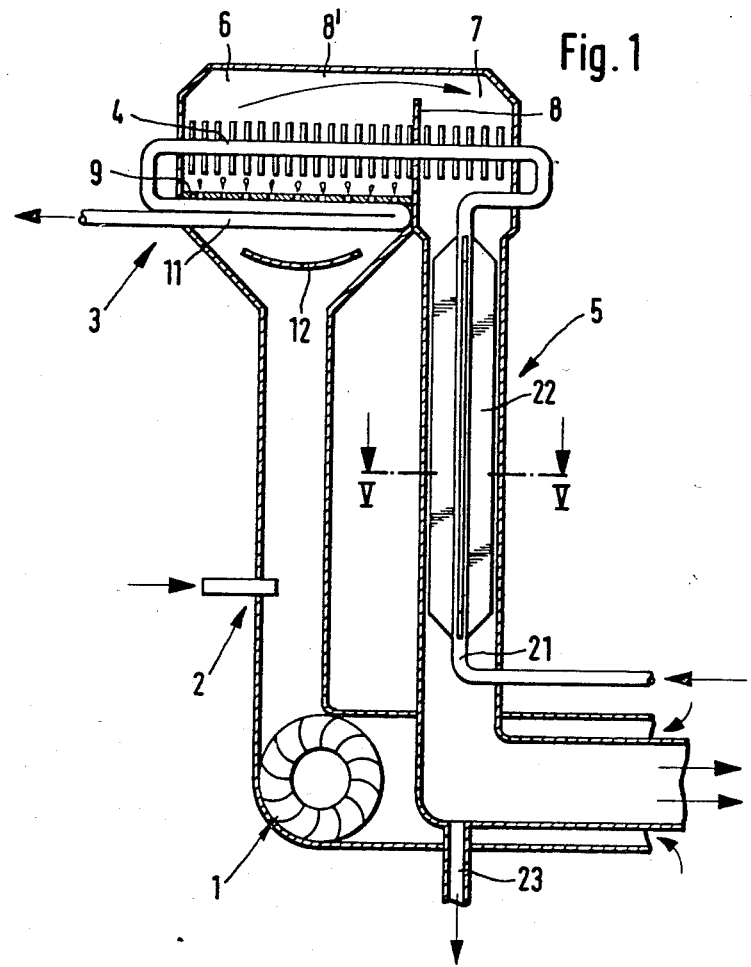
FIG. 1, a vertical cross-section through a gas water heater according to the invention with the outside-wall design.

According to FIG. 1, the gas water heater according to the invention comprises a blower 1 which conveys combustion air at low pressure (about 1–3 mbar) to a premixing device 2. There the combustion air is mixed with gas whereupon the mixture is moved upward, to a gas burner 3. The latter impacts a heat exchanger 4 which is located above and through which heating water flows. There is a vertical condensation heat exchanger 5 adjoining this heat exchanger 4.

In the area of heat exchanger 4, the waste gas duct forms two chambers 6 and 7 which are located next to each other, through which waste gas flows in opposite directions, and whose partition or separation wall 8 subdivides the heat exchanger into two segments associated with the chambers and outside the heat exchanger area defines a waste-gas diversion opening 8'. Heat exchanger 4 is made in the form of a laminated or heat exchanger and heating water flows through it from right to left. The subdivision is so arranged that two-thirds of the heat exchanger's surface will be in chamber 6.

Figure 2:
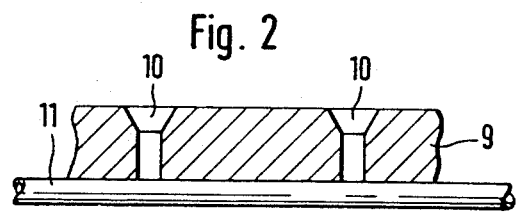
FIG. 2, a broken-off section of the burner plate.

Chamber 6 forms a combustion chamber—which is closed off against the entry of outside air—for the gas burner 3. The latter works as a superstoichiometrically premixing burner. It reveals a burner plate 9 which, according to FIG. 2, is provided with a plurality of mixture passage openings 10, specifically, with ten per square centimeter. The diameter of mixture passage openings 10 is 1.8 mm and becomes wider by 50% toward the flame side. Burner plate 9 consists of an aluminum alloy with a thickness of 5 mm and, on its reverse side, bears a cooling coil 11 through which flows heating water coming from heat exchanger 4. The burner plate is arranged at an interval of less than 30 mm with respect to heat exchanger 4. Directly below the burner plate, there is a cross-section constriction in the form of a piece of sheet metal 12 to prevent burner oscillations.

The waste gas coming out of burner 3 is cooled off in heat exchanger 4 to the vicinity of the dew point and, in the adjoining condensation heat exchanger 5, it is cooled down to below the dew point, practically down to the return temperature of the heating water.

Figure 3:
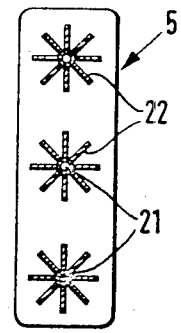
FIG. 3, a cross-section along line V—V in FIG. 1.

According to FIGS. 1 and 3, condensation heat exchanger 5 consists of vertical pipes 21 which carry access parallel ribs 22 and which, with the later, form a star-shaped, commercially available section piece consisting of a corrosion-resistant aluminum alloy. The condensate is precipitated along the ribs and, in the form of a laminar film, without droplet formation, flows down along the ribs. It is then evacuated through a condensate outlet 23. According to FIG. 3, pipes 21 are arranged next to each other in a common plane so that the condensation heat exchanger gets a flat cross-section with favorable flow conditions.

We claim:

1. A gas water heater comprising:
   a gas burner for producing waste gases;
   duct means for receiving the burner's waste gases, said duct means including a first chamber means located next to said burner for guiding the waste gases generally in a first direction, a second chamber means for guiding the waste gases in a second direction generally opposite to said first direction and a partition wall adjacent both said first and second chamber means,
   heat exchanger means for subjecting heating water passing therethrough to heat transfer from the waste gases within said first and second chamber means, said heat exchanger means crossing said partition wall and having first and second heat exchanging segments on opposite sides of said partition wall, said first segment being located in said second chamber means and said second segment being located in said first chamber means, both said heat exchanging segments being flowed through by said heating water transversely to the waste gas flowing directions in said first and second chamber means of said duct means; and
   said partition wall defining, spaced from said heat exchanger means, a waste gas diversion opening for passing the waste gas current from said first chamber means into said second chamber means.

2. The gas water heater as in claim 1, wherein said second segment of said heat exchanger located in said first chamber is substantially larger than said first segment.

3. The gas water heater as in claim 1, wherein said heat exchanger means has a heating water inlet provided at the first segment spaced from said first chamber and a heating water outlet provided at the opposite end of said second segment.

4. The gas water heater as in claim 3, wherein said first chamber is arranged above the gas burner and said second chamber is located horizontally beside said first chamber with said partition wall being between said first and second chambers.

5. The gas water heater as in claim 4, wherein said second segment of said heat exchanger located in said first chamber comprises two-thirds of the heat exchanging surfaces of said heat exchanger means.

6. The gas water heater as in claim 1, wherein said gas burner is a super-stoechiometrically premixing gas burner having a burner plate provided with four to twelve openings per square centimeter and has a cooling coil attached to its side opposite to said first chamber, and said first chamber forming a combustion chamber that is closed off against the entry of outside air.

7. The gas water heat as in claim 6, wherein there are nine to ten mixture passage openings per square centimeter.

8. The gas water heater as in claim 6, wherein said burner plate is spaced less than 50 mm from said second segment of said heat exchanger.

9. The gas water heater as in claim 8, wherein said spacing is less than 30 mm from said second segment of said heat exchanger.

10. The gas water heater as in claim 8 wherein said mixture passage openings of said burner plate have a diameter of 1 to 2.5 mm, which becomes wider by 50% toward said first chamber.

11. The gas water heater as in claim 10, wherein said diameter is about 1.8 mm.

12. The gas water heater as in claim 6, wherein said heat exchanger means has a heating water outlet connected to said cooling coil.

13. The gas water heater as in claim 6, wherein said burner plate consists of well heat-conducting material selected from the group consisting of copper and aluminium alloy.

14. The gas water heater as in claim 6, wherein said burner plate consists of a high-grade steel and has a thickness of about 2 mm.

15. The gas water heater as in claim 6, further comprising a premixing device having a mixture path leading to said burner plate, said mixture path including a cross-section constriction located immediately upstream said burner plate.

16. The gas water heater as defined in claim 6 further comprising a premixing device having a blower, said premixing device extending substantially parallel to said condensation heat exchanger.

17. The gas water heater as in claim 16 including an input tube for said blower, and wherein said duct means has a tube like duct section downstream, with respect to the gas, from said condensation heat exchanger, said tube like duct section being coaxially arranged with said input tube of said blower.

18. The gas water heater as in claim 1, wherein said duct means further comprise a condensation heat exchanger arranged downstream, with respect to the waste gas, from said first segment, and said condensation heat exchanger having means guiding said flue gas along said condensation heat exchanger from the top to the bottom thereof, a condensation outlet and at least one substantially vertically extending pipe that is flowed through by the heating water from the bottom towards the top in countercurrent to said waste gases, said pipe having outwardly projecting ribs extending parallel to the pipe axis.

19. The gas water heater as in claim 18, wherein said pipe and ribs combination has a star-shaped cross section.

20. The gas water heater as in claim 19, wherein said pipe and rib combination consists of an aluminum alloy, which is corrosion-resistant to waste gases and waste gas condensate.

21. The gas water heater as in claim 18, wherein a plurality of said pipes are arranged side by side having their axes located in a common plane.

22. The gas water heater as defined in claim 18 further comprising a premixing device having a blower, said premixing device extending substantially parallel to said condensation heat exchanger.

23. The gas water heater as in claim 22, including an input tube for said blower, and wherein said duct means has a tube like duct section downstream, with respect to the gas, from said condensation heat exchanger, said tube like duct section being coaxially arranged with said input tube of said blower.

24. The gas water heater as in claim 18, wherein said gas burner is a super-stoechiometrically premixing gas burner having a burner plate provided with four to twelve openings per square centimeter and has a cooling coil attached to its side opposite to said first chamber, and said first chamber forming a combustion chamber that is closed off against the entry of outside air.

25. The gas water heater as defined in claim 24 further comprising a premixing device having a blower, said premixing device extending substantially parallel to said condensation heat exchanger; and including an input tube for said blower, and wherein said duct means has a tube like duct section downstream, with respect to the gas, from said condensation heat exchanger, said tube like duct section being coaxially arranged with said input tube of said blower.

* * * * *